US012342189B2

(12) United States Patent
Gomes et al.

(10) Patent No.: US 12,342,189 B2
(45) Date of Patent: Jun. 24, 2025

(54) CELLULAR NETWORK INDOOR TRAFFIC AUTO-DETECTION

(71) Applicant: Telefonaktiebolaget LM Ericsson (publ), Stockholm (SE)

(72) Inventors: Eugene Gomes, Plano, TX (US); Xin Li, Allen, TX (US); Mahmood Osorio, Rockwall, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 398 days.

(21) Appl. No.: 17/904,713

(22) PCT Filed: Jan. 15, 2021

(86) PCT No.: PCT/IB2021/050278
§ 371 (c)(1),
(2) Date: Aug. 19, 2022

(87) PCT Pub. No.: WO2021/171103
PCT Pub. Date: Sep. 2, 2021

(65) Prior Publication Data
US 2023/0071942 A1 Mar. 9, 2023

Related U.S. Application Data

(60) Provisional application No. 62/704,071, filed on Feb. 26, 2020.

(51) Int. Cl.
*H04W 24/02* (2009.01)
*H04W 16/20* (2009.01)
*H04W 84/18* (2009.01)

(52) U.S. Cl.
CPC ........... *H04W 24/02* (2013.01); *H04W 16/20* (2013.01); *H04W 84/18* (2013.01)

(58) Field of Classification Search
CPC ..... H04W 24/02; H04W 16/20; H04W 84/18; H04W 16/225; H04W 88/18; H04W 64/00; H04W 72/542; H04W 72/54
See application file for complete search history.

(56) References Cited

U.S. PATENT DOCUMENTS

| 9,584,966 B1 * | 2/2017 | Thiel ................. H04W 4/02 |
| 2011/0281579 A1 * | 11/2011 | Kummetz ........... H04W 24/08 455/424 |

(Continued)

FOREIGN PATENT DOCUMENTS

| CN | 106304153 B | 12/2019 |
| CN | 106954256 B | 1/2020 |
| EP | 3151029 B1 | 11/2019 |

OTHER PUBLICATIONS

International Search Report and Written Opinion for Application No. PCT/IB2021/050278, May 7, 2021, 15 pages.

(Continued)

*Primary Examiner* — Quoc Thai N Vu
(74) *Attorney, Agent, or Firm* — Nicholson De Vos Webster & Elliott LLP (57) ABSTRACT

A method, system and network node for detecting indoor traffic of a wireless communications network by obtaining data associated with an operation of a cell of the wireless communication network and determining a quality grading and coverage grading for the cell from the obtained data. The combined quality and coverage grading results are assessed to determine an approximate value corresponding to an amount of cell traffic assessed as being indoor traffic and generating an output indicating the amount of cell traffic as being indoor traffic.

16 Claims, 7 Drawing Sheets

(56) References Cited

U.S. PATENT DOCUMENTS

2016/0021503 A1   1/2016  Tapia
2017/0013418 A1*  1/2017  He .......................... H04W 8/24
2021/0195448 A1*  6/2021  Zhao ..................... H04W 24/08

OTHER PUBLICATIONS

J. Perez-Romero et al., "Impact of Indoor Traffic on W-CDMA Capacity," 2004, pp. 2861-2865, IEEE.

* cited by examiner

CELLULAR NETWORK INDOOR TRAFFIC AUTO-DETECTION

CROSS-REFERENCE TO RELATED APPLICATIONS

This application is a National stage of International Application No. PCT/IB2021/050278, filed Jan. 15, 2021, which claims the benefit of U.S. Provisional Application No. 62/704,071, filed Feb. 26, 2020, which are all hereby incorporated by reference.

TECHNICAL FIELD

Embodiments of the disclosure relate to the field of wireless communication; and more specifically, to the detection of a portion of cell traffic serving indoor users.

BACKGROUND ART

In the modern cellular network, user location awareness for users associated with a cell of a network is an important step for operations, planning and optimization. Presently, the network can triangulate an approximate position of a terminal device within a cell or sector of a cell by use of directional beams or similar triangulating techniques or use geolocation, such as Global Positioning System (GPS). However, in these instances, only geo-location of the device is detectable. In order to determine the environment of the located position, the located position needs a second step of correlating the position to the surrounding environment. Alternatively, there are existing solutions using crowd sourced data, such as collecting data from users utilizing particular application(s). Such existing solutions that rely on crowd source data are dependent on the user to download and use an application (APP). This data typically needs to be purchased from third parties and may be hard to come by. The data may not provide the surrounding environment in which the users reside.

For a wireless communications network provider, user location awareness in the network is a very important step for operations, planning and optimization of the network. One aspect of user location awareness is determining whether the user is indoor, (such as a residence, office building, etc.) versus not being indoor. For a cell, it is advantageous to know that a certain percentage of the users within the cell coverage are indoor. As an example, users indoor typically require more power to communicate with the cell tower of a base station (e.g., eNodeB). The base station would typically boost power to improve the link, however, care must be taken not to exceed the electromagnetic field exposure established by regulations, in order not to subject the users to excessive radiation. When large number of users are indoor, a different strategy can be utilized to optimize the network as compared to when such users are outdoor.

There currently exist certain challenges for achieving the goal above for a network provider. The network provider can purchase crowd sourced data or attempt to correlate geo-location data with another database that provides the surrounding environment for the triangulated location data. However, because network providers do collect operational data regarding traffic for cells and other key performance indicator from the network, an advantage would be to use this collected data to identify a number of users (e.g., percentage of users of a cell) that are indoor. In this manner, indoor traffic for a cellular network can be detected from operation data collected by the network, without accessing external (e.g., 3rd party) sources. Furthermore, network data collection and processing allows for auto-detection of such indoor traffic.

SUMMARY

Certain aspects of the present disclosure and their embodiments may provide solutions to challenges noted above. In one aspect of the disclosed system, a method provides for detecting indoor traffic of a wireless communications network, wherein the method comprises obtaining data associated with an operation of a cell of the wireless communication network. The method further provides for determining a quality grading for the cell from the obtained data and determining a coverage grading for the cell from the obtained data. The method further provides for assessing the quality grading and the coverage grading to determine an approximate value corresponding to an amount of cell traffic assessed as being indoor traffic and generating an output indicating the amount of cell traffic as being indoor traffic.

In a second aspect of the disclosed system, a network node of a wireless communications network for detecting indoor traffic of the wireless communications network is configured to obtain data associated with an operation of a cell of the wireless communication network. The network node is further configured to determine a quality grading for the cell from the obtained data and determine a coverage grading for the cell from the obtained data. The network node is further configured to assess the quality grading and the coverage grading to determine an approximate value corresponding to an amount of cell traffic assessed as being indoor traffic and generate an output indicating the amount of cell traffic as being indoor traffic.

In a third aspect of the disclosed system, a computer program comprising instructions which, when executed by at least one processing circuitry of a network node of a wireless communication network, is capable of detecting indoor traffic of the wireless communications network by performing operations comprising obtaining data associated with an operation of a cell of the wireless communication network, determining a quality grading for the cell from the obtained data, and determining a coverage grading for the cell from the obtained data. The program further assessing the quality grading and the coverage grading to determine an approximate value corresponding to an amount of cell traffic assessed as being indoor traffic and generating an output indicating the amount of cell traffic as being indoor traffic.

In a fourth aspect of the disclosed system, a carrier contains the computer program according to the third aspect, wherein the carrier is one of an electronic signal, optical signal, radio signal or computer storage medium.

There are, proposed herein, various embodiments which address one or more of the issues disclosed herein. Certain embodiments may provide one or more of the following technical advantage(s). The solutions involve using intelligence from the network or self-organizing network platform coupled with additional logic to operate within the communications network. By combining both the intelligence from existing technology and technical personnel knowledge, the solutions herein can help address at a mass scale what several mobile operators and operations teams are needing in their daily operation. Also, knowing if the devices generating traffic are IoT (internet of things) devices, Category-M (CAT-M) devices, Machine-to-Machine (M2M) devices, or categorization based on use, such as data, voice, video streaming, etc., the described technique to auto-detect indoor traffic can assist considerably in self-organizing network platforms and other automations for decision making purposes. Thus, the solutions allow for categorizing indoor traffic by segregating indoor traffic detection for a particular set of devices connected to the cell or for a particular use by devices connected to the cell.

There are, proposed herein, various embodiments which address one or more of the issues disclosed herein. Certain embodiments may provide one or more of the following technical advantages:

- The solution can automatically detect cells that are serving indoor users or devices that are generating traffic indoors;
- With further intelligence on devices, especially IoT (internet of things), and radio or network slices, it is possible to enrich the data;
- The solution uses measurements that are derived empirically using statistical models;
- Key Performance Indicators (KPIs) are derived using intelligence from the network or via the self-organizing network platform; and
- Output can be used for network operations, planning, and optimization.

BRIEF DESCRIPTION OF THE DRAWINGS

The present disclosure may best be understood by referring to the following description and accompanying drawings that are used to illustrate embodiments of the present disclosure. In the drawings.

DETAILED DESCRIPTION

The following description describes methods and apparatus for cellular network indoor traffic auto-detection. The following description describes numerous specific details such as operative steps, resource implementations, types of network data collected, types of collected data used, different manner of data grading and assessment, and interrelationships of system components to provide a more thorough understanding of the present disclosure. It will be appreciated, however, by one skilled in the art that the embodiments of the present disclosure can be practiced without such specific details. In other instances, control structures, circuits, memory structures, and software instruction sequences have not been shown in detail in order not to obscure the present disclosure. Those of ordinary skill in the art, with the included descriptions, will be able to implement appropriate functionality without undue experimentation.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, model, or characteristic is described in connection with an embodiment, it is submitted that it is within the knowledge of one skilled in the art to effect such feature, structure, characteristic, or model in connection with other embodiments whether or not explicitly described.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in some embodiments of the present disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Some of the embodiments contemplated herein apply to wireless communication technologies applicable to the 3rd Generation Partnership Project (3GPP). Some embodiments can apply to other older radio technology as well. The disclosure describes the area of coverage as a cell of a cellular network. However, the area need not be limited to a cell and can apply to other coverage areas or designations.

Figure 1:
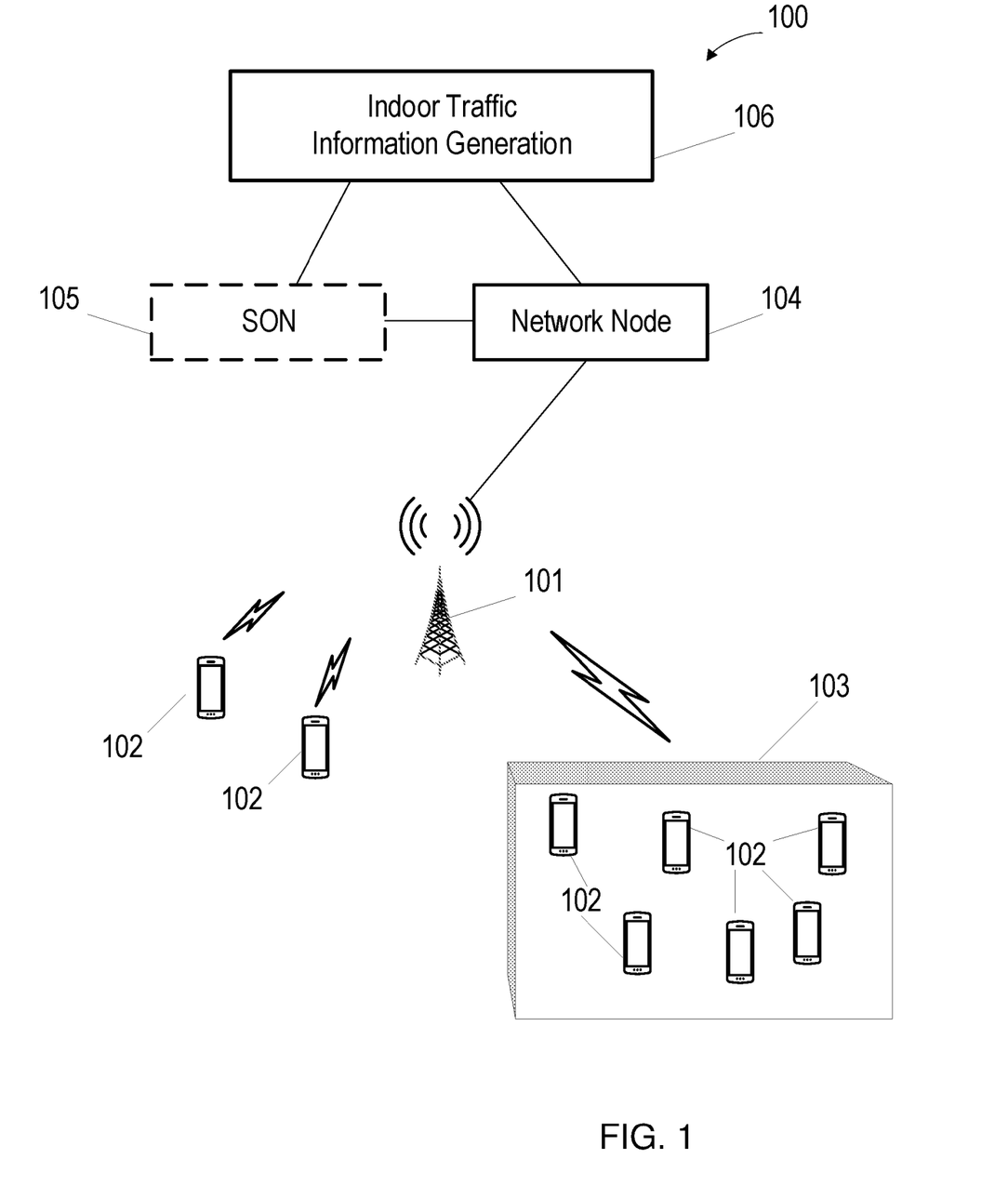
FIG. 1 illustrates a wireless communication network, according to some embodiments of the present disclosure.

FIG. 1 shows a wireless communication network 100 according to some embodiments of the present disclosure. The network 100 can at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/ Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some options. The network 100 may be suitable for providing radio communications meeting one or more of the criteria established by the Next Generation Mobile Networks Alliance for the 5th generation of mobile telecommunications standards (e.g., 5G/NR). In some embodiment, the communication network 100 can be a wireless cellular network.

The wireless communication network 100 comprises one or more radio access nodes. FIG. 1 only shows one radio access node 101, but the skilled person will appreciate that any number of radio access nodes may be provided. The radio access node 101 can be referred to as a base station, NodeB, evolved NodeB (eNB, or eNodeB), gNodeB, base transceiver station, Access Point Base Station (or just Access Point), base station router, Radio Base Stations (RBS), macro base station, micro base station, pico base station, femto base station, Home eNodeB, relay and/or repeater, beacon device or any other network node configured for communication with wireless devices over a wireless interface, depending on the radio access technology and terminology used. The functions of the radio access node 101 may be distributed across one or more physical nodes. For example, each radio access node may be divided logically into more than one unit, comprising one or more of the following: a centralized unit (CU), a distributed unit and a radio unit (RU), remote radio head (RRH) or transmission point (TP).

The radio access node 101 can serve one or more cells of the network 100. For purposes of description and explanation, the radio access node 101 discussion below references only a cell. Hence, radio access node 101 is described as part of a cellular network having a coverage of at least one cell. Within a cell, wireless devices 102 communicate with the radio access node 101 to provide services to users of the devices as is familiar to those skilled in the art. The radio access node 101 further communicates with a network node or nodes, such as network node 104 for co-ordination and control, and provides access to other parts of the network 100 or to other external networks, such as the Internet.

FIG. 1 shows a multiple wireless terminal devices 102 in communication with the radio access node 101. The terminal devices 102 can be referred as a user equipment (UE), mobile device, mobile terminal device, wireless terminal device, etc. Those skilled in the art will appreciate that wireless signals are transmitted between the radio access node 101 and the terminal device 102 using radio resources which are controlled by the network node 104. FIG. 1 shows one radio access node 101 to provide the coverage area for the terminal devices 102, but any number of radio access nodes maybe present.

Generally, a transmission coverage area from a transmission point, such as the radio access node 101, is commonly referred to as a cell. There may be multiple cells associated with the radio access node 101. The cell coverage area also shows a building 103, in which a number of terminal devices 102 reside within the building 103. Thus, users of some of the terminal devices 102 are indoor, while users of other terminal devices are outdoor.

FIG. 1 also illustrates a Self-Organizing Network (SON) 105 for collecting various network data. SONs are a critical enabler supporting the widespread deployment of mobile broadband technologies, and can provide functionalities beyond data collection, such as self-configuring, self-optimizing, and self-healing functionalities. SON 105 may use an optimization manager to automate network optimization where the SON 105 makes the most use of already available functionalities. Thus, SON 105 can be used for network data collection in some embodiments. The SON 105 is shown with a dashed line to signify that it is optional and may be used or not used. In some embodiments, the network node 104 may provide the data collection function. In some embodiments the SON 105 is part of the network node 104.

The network 100 also comprises an indoor traffic information generation functionality 106 for providing the analysis and assessment for detecting indoor traffic within the cell coverage of radio access node 101. In some embodiments, indoor traffic information generation functionality 106 is a separate network node of network 100. In some embodiments, indoor traffic information generation functionality 106 is part of network node 104 or part of SON 105. The operation of the indoor traffic information generation functionality 106 is further described in the disclosure with reference to the other Figures.

Figure 2:
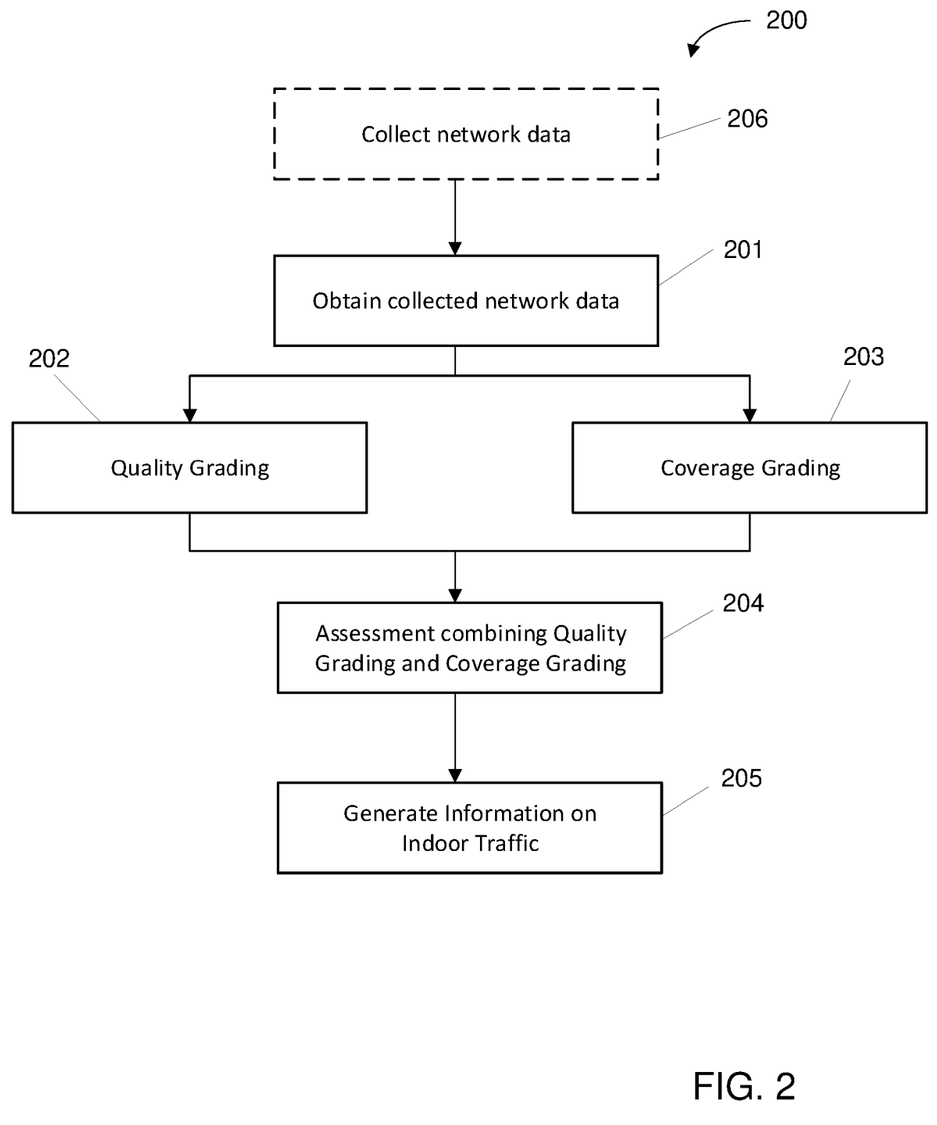
FIG. 2 illustrates a flow diagram for a method of operation, according to some embodiments of the present disclosure.

FIG. 2 is a flow diagram depicting a method 200 performed by the indoor traffic information generation functionality 106 according to some embodiments. At operation 201, the method obtains collected network data, which data pertains to the operation of a cell within the network, such as network 100. The collected data, of which some are discussed below, provide the source data for assessing the indoor traffic associated with the cell. As noted above, the data collection may be by the network node 104, SON 105, or some other node of network 100.

In some embodiments, operation 206 is included as part of method 200. Operation 206 performs the data collection as part of network operations. Thus, SON 105 may perform such data collection as part of network optimization and the data collected made available for operations 201-205.

The collected or obtained data comprise one or more of:
cell coverage assessment;
cell center coverage assessment;
uplink signal to noise value;
uplink signal to noise absolute ratio;
group carrier information;
area code tracking information; and
urban-rural morphology classification of the cell.

These are examples only and other data can be collected in other embodiments.

After obtaining the data, operation 202 selects some of the data to determine a quality grading of the cell. Quality grading for a cell involves statistical modeling or sampling of uplink signals. Typically, terminal devices operating indoors exhibit lower uplink signal quality due to the building enclosure being an obstacle to signal propagation. Although the method can use a variety of data for the determination of quality grading, in some embodiments the quality grading is determined by one or more of:
performing statistical modeling of uplink signals to determine cumulative distribution function on uplink signal quality;
performing statistical modelling of uplink signals to determine uplink signal quality and compare the uplink signal quality with other cells; and
performing percentage sampling of uplink quality metrics of the uplink signals to compare percentile value with other cells.

These are examples only and other operations can be used on other data in other embodiments.

Also, after obtaining the data, operation 203 selects some of the data to determine a coverage grading of the cell. The method 200 can perform operation 203 after operation 202, before operation 202, or simultaneously with operation 202. Coverage grading for a cell involves analysis or calculation of characteristics associated with cell edge coverage and/or cell center coverage. Although the method can use a variety of data for the determination of coverage grading, in some embodiments the coverage grading is determined by one or more of:
performing cell edge coverage cumulative distribution function based analysis by use of precomputed upper and lower percentile thresholds;
performing cell edge coverage cumulative distribution function based analysis by evaluating a level of poor coverage at cell edge;
performing cell center cumulative distribution function based analysis by computing percentile thresholds for cell center coverage; and
performing cell center cumulative distribution function based analysis by assessing a relative cell center coverage in terms of poor, medium, or good relative to other cells.

These are examples only and other operations can be used on other data in other embodiments.

Once the method 200 determines quality grading and coverage grading, the method performs operation 204 to make an assessment on the resultant quality grading and the resultant coverage grading. By combining the two grading results, the assessment can identify a certain amount of terminal devices that have lower quality grading and/or coverage grading, so that an approximate amount of these terminal devices can be assumed to be located indoor. Although the method 200 can use a variety techniques on the results obtained from the quality grading and the coverage grading, in some embodiments the assessment is made by one or more of:

- assessing indoor traffic determination combining uplink quality metrics and cell edge metrics by comparative analysis of cell edge grading in terms of predetermined grades;
- assessing indoor traffic determination combining uplink quality metrics and cell edge metrics by reference comparison to quality assessment;
- assessing cell center evaluation by determining whether cell center analysis meets a predetermined threshold; and
- assessing a combination of quality and coverage imbalance to generate a list of indoor traffic.

These are examples only and other assessments can be used in other embodiments.

Thus, operation 204 assesses the grading of the various terminal devices in the cell and derives an amount or value (number, percentage, etc.) that corresponds to users in the cell who are regarded, most likely, to reside indoor. Operation 205 shows the generation of this information on the terminal devices predicted to be indoor as indoor traffic. The indoor traffic provides an approximate number of users or percentage of users in the cell that are predicted to be indoor. The network node 104 and/or SON 105, or other nodes of the network can then use this information to make cell adjustments for optimization.

Figure 3:
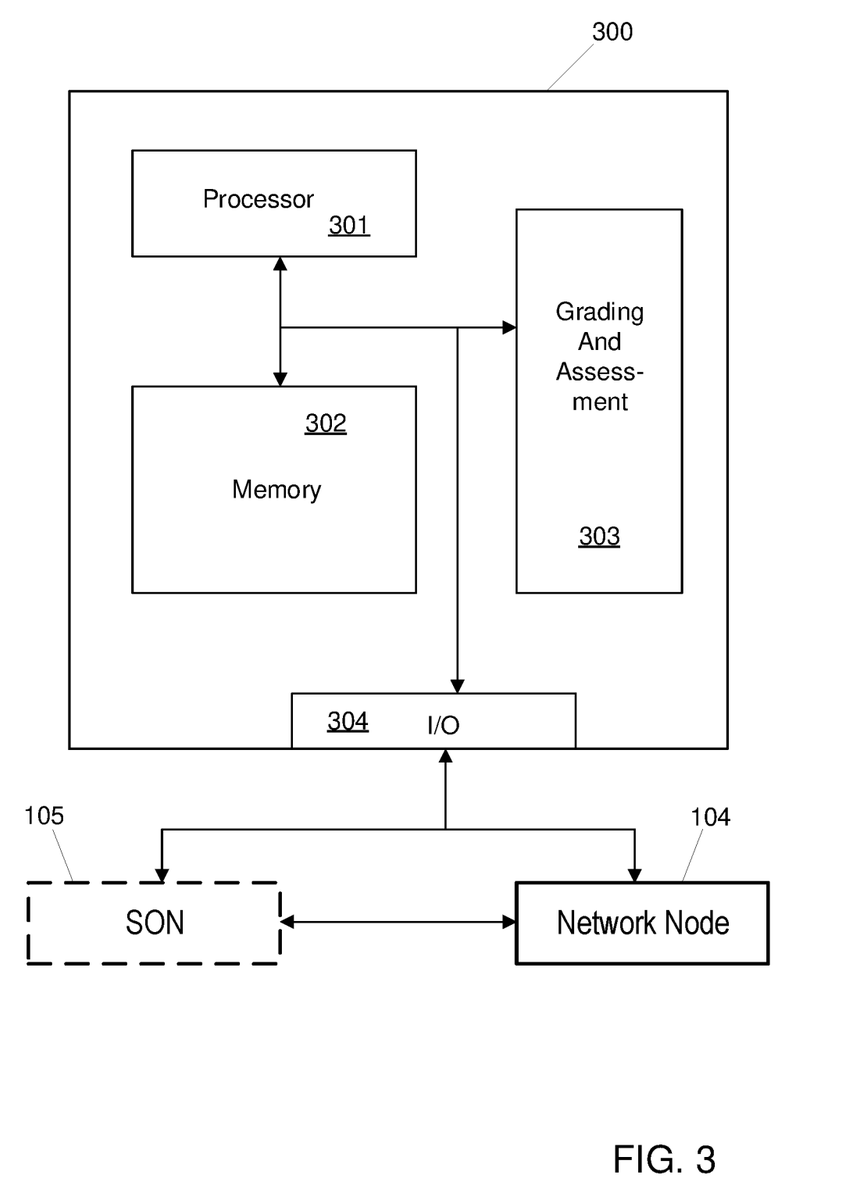
FIG. 3 illustrates a system, according to some embodiments of the present disclosure.

FIG. 3 shows a system 300 depicting the indoor traffic information generation functionality 106 according to some embodiments of the present disclosure. The system 300 comprises at least one processor 301, memory 302, and grading and assessment module 303. The system 300 may be part of the network node 104, SON 105, or part of another network node of the wireless communications network 100. When operating as a separate device, system 300 may include an input/output (I/O) interface 304 for obtaining the collected data and outputting the generated result.

The processor 301 performs processing and/or control functions for system 300. The memory 302 stores data, such as the earlier described collected data or data obtained from the collected data of operations 201 and/or 206, as well as including instructions to perform the method 200. The memory can be a computer readable storage medium, such as, but not limited to, any type of disk including magnetic disks, optical disks, CD-ROMs, and magnetic-optical disks, read-only memories (ROMs), random access memories (RAMs), EPROMs, EEPROMs, magnetic or optical cards, or any type of media suitable for storing data and program instructions.

The grading and assessment module 303 can perform the quality and coverage grading functions of the operations 202, 203 and the assessment of the combined grading results as described for the operation 204. The system 300 can implement the grading and assessment module 303 in software, hardware, firmware, or a combination thereof. When implemented in software, software instructions which, when executed by the processor 301, are capable of configuring the system 300 to perform the methods described in the present disclosure.

Figure 4:
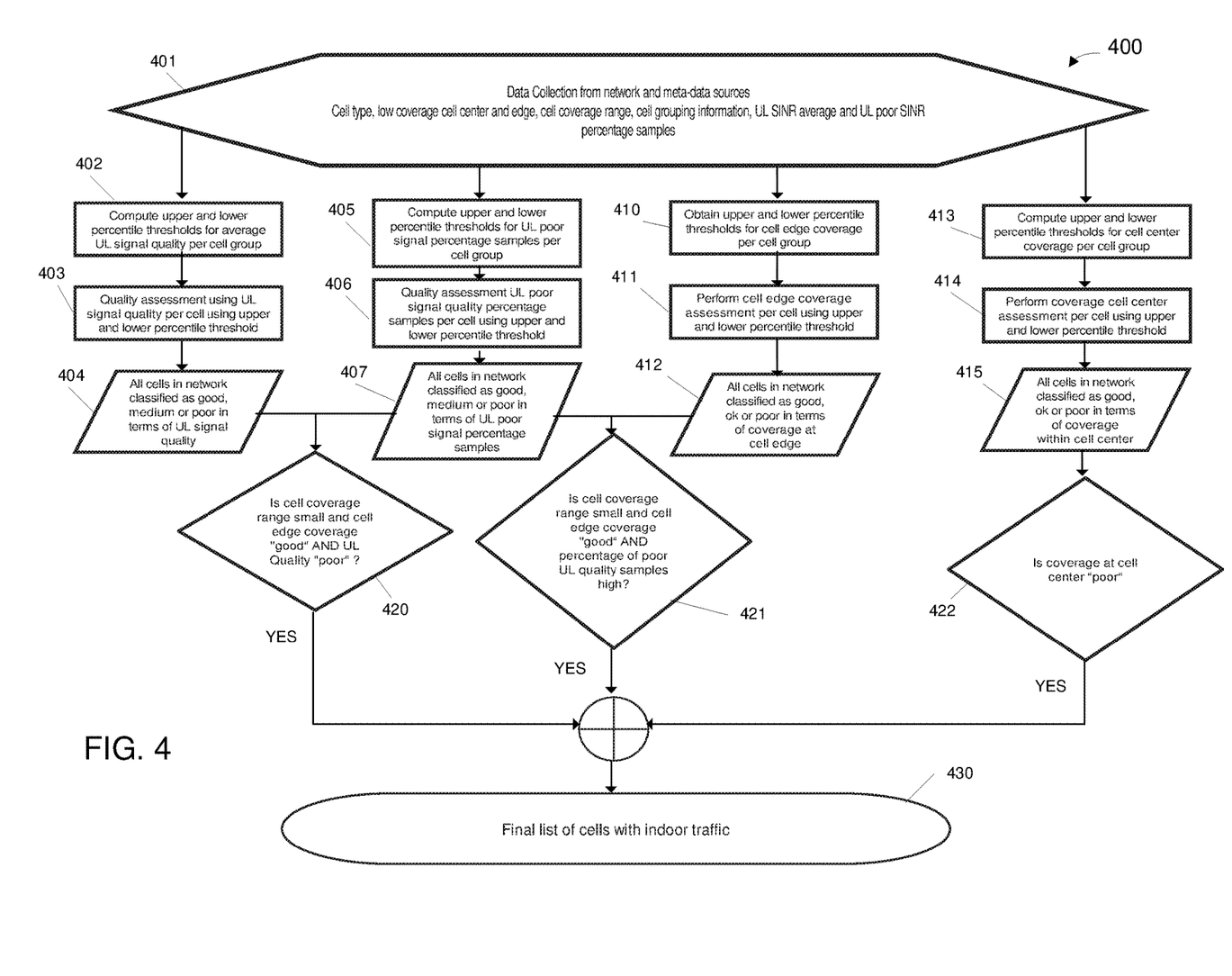
FIG. 4 illustrates a more detailed flow diagram for another method of operation, according to some embodiments of the present disclosure.

FIG. 4 is a more detailed flow diagram for another method 400 of operation, according to some embodiments of the present disclosure. The method 400 is an expansion of the method 200 of FIG. 2 and showing details of more operations to generate a final list of cell or cells with indoor traffic information. In reference to FIG. 4, operation 401 corresponds to operation 201 or the combination of operations 206 and 201. Operations 402-407 correspond to the quality grading of operation 202. Operations 410-415 correspond to the coverage grading of operation 203. Operations 420-422 correspond to the assessment of combined quality and coverage gradings of operation 204. Operation 430 corresponds to generating information on indoor traffic of operation 205.

The individual operational details are noted below with reference to drawing numerals of FIG. 4. Thresholds and percentages are relative and adapt to the location network and conditions where the solution runs.

401—Data collection from network and meta-data sources, such as cell type, low coverage cell center and edge, cell coverage range, cell grouping information, uplink (UL) signal-to interference+noise-ratio (SINR) average and UL poor SINR percentage samples.

402—Compute upper and lower percentile thresholds for average uplink (UL) signal quality per cell group.

403—Quality assessment using UL signal quality per cell using upper and lower percentile threshold.

404—All cells in network classified as good, medium or poor in terms of UL signal quality.

405—Compute upper and lower percentile thresholds for UL poor signal percentage samples per cell group.

406—Quality assessment UL poor signal quality percentage samples per cell using upper and lower percentile threshold.

407—All cells in network classified as good medium or poor in terms of UL poor signal percentage samples.

410—Obtain upper and lower percentile thresholds for cell edge coverage per cell group.

411—perform cell edge coverage assessment per cell using upper and lower percentile threshold.

412—All cells in network classified as good, acceptable, or poor in terms of coverage at cell edge.

413—Compute upper and lower percentile thresholds for cell center coverage per cell group.

414—Perform coverage cell center assessment per cell using upper and lower percentile threshold.

415—All cells in network classified as good, acceptable, or poor in terms of coverage within cell center.

420—Assessment of: Is cell coverage range small and cell edge coverage good and UL quality poor?

421—Assessment of: Is cell coverage range small and cell edge coverage good and percentage of poor UL quality samples high?

422—Assessment of: Is coverage at cell center poor?

430—Assessments of operations 420-422, when "True" are combined to generate a final list of cell or cells having indoor traffic predicted and approximate indication of an amount of indoor traffic for each cell.

Furthermore, because of the capability of performing automated detection (auto-detection), the network can apply the disclosed technique to a group of cells and generate a list of cells having indoor traffic. Also, because radio slicing and/or network slicing allows segregation of traffic within the network, the network can identify if the devices generating traffic are IoT (Internet of Things) devices, Category-M (CAT-M) devices, Machine-to-Machine (M2M) devices, or categorization based on use, such as data, voice, video streaming, etc. Therefore, the described technique allows for categorizing indoor traffic by segregating indoor traffic detection for a particular set of devices connected to the cell or for a particular use by devices connected to the cell.

Figure 5:
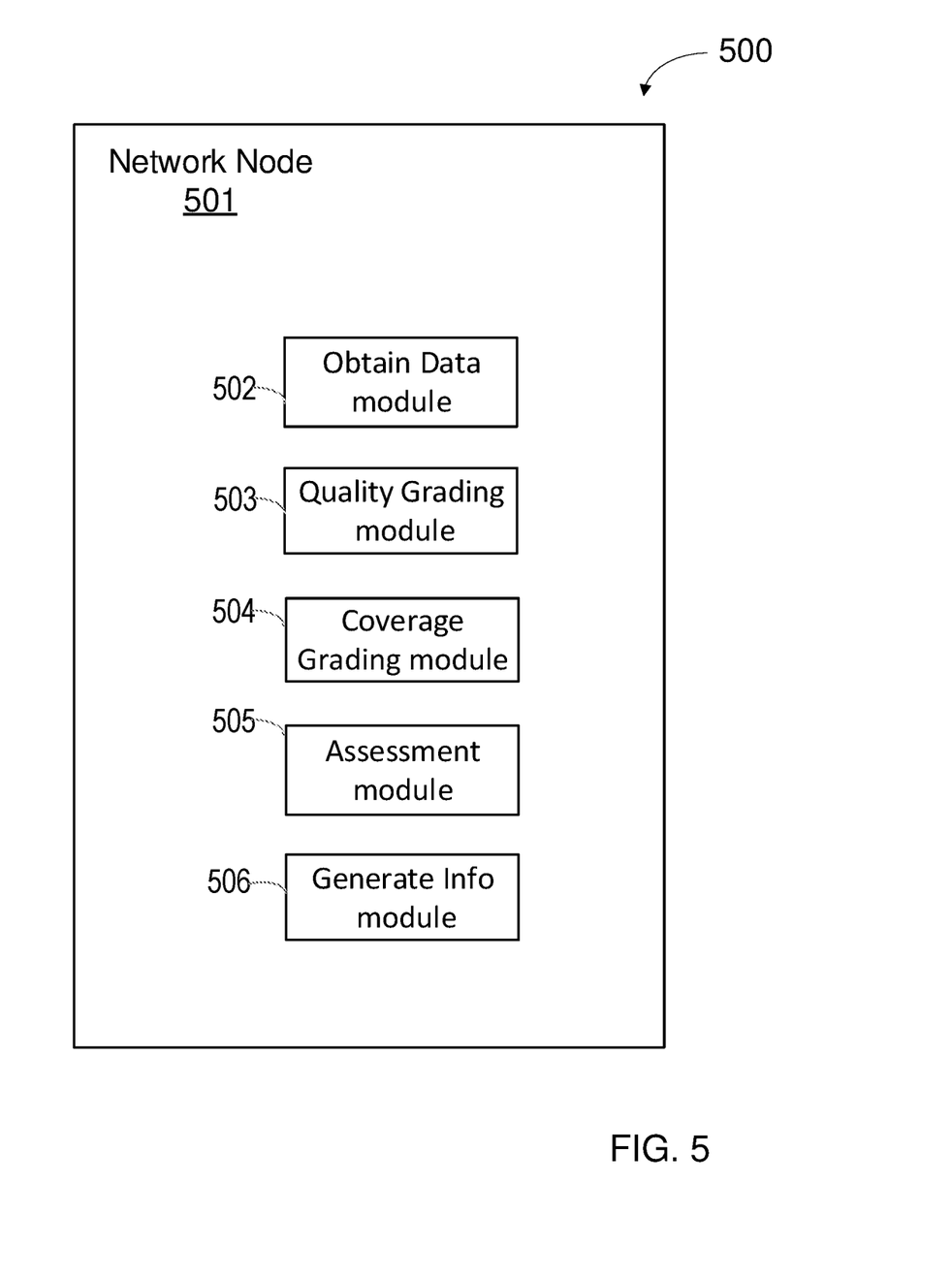
FIG. 5 illustrates a network node, according to some embodiments of the present disclosure.

FIG. 5 is a schematic diagram 500 of a network node 501 according to some embodiments of the present disclosure. The network node 501 can implement the functions of the indoor traffic information generation functionality 106 of FIG. 1 and the method 200 of FIG. 2, as well as the system 300 of FIG. 3 or the method 400 of FIG. 4. The network node 500 can comprise or be part of the network node 104 or SON 105, or implemented in another network node of the wireless communication network 100.

The network node 501 comprises an obtain data module 502, a quality grading module 503, coverage grading module 504, an assessment module 505 and a generate information module 506. The obtain module 502 can perform operations corresponding to the operation 201 of method 200 to obtain the collected data, or both operations 206 and 201. The quality grading module 503 can perform operations corresponding to the operation 202 to determine the quality grading based on the collected data. The coverage grading module 504 can perform operations corresponding to the operation 203 to determine the coverage grading based on the collected data. The assessment module 505 can perform operations corresponding to the operation 204 in assessing the combined quality grading and coverage grading results to derive a result indicative of an approximate number of terminal devices, hence users, that are predicted to be indoor. The generate information module 506 can perform operations corresponding to the operation 205 to generate the relevant information regarding the prediction of the number of terminal devices (or a percentage of total number of terminal devices) connected to the cell that are predicted to be indoor. This prediction is based on user traffic data of the cell that was collected as collected data pertaining to the cell.

In some embodiments, the modules 502-506 can be provided as a computer program product, or software, that can include a machine-readable medium having stored thereon instructions, which can be used to program a computer system (or other electronic device) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In some embodiment, the modules of the network node 501 are implemented in software. In other embodiments, the modules of the network node 501 are implemented in hardware. In further embodiments, the modules of the network 501 are implemented in a combination of hardware and software. In some embodiments, the computer program can be provided on a carrier, where the carrier is one of an electronic signal, optical signal, radio signal or computer storage medium.

Figure 6:
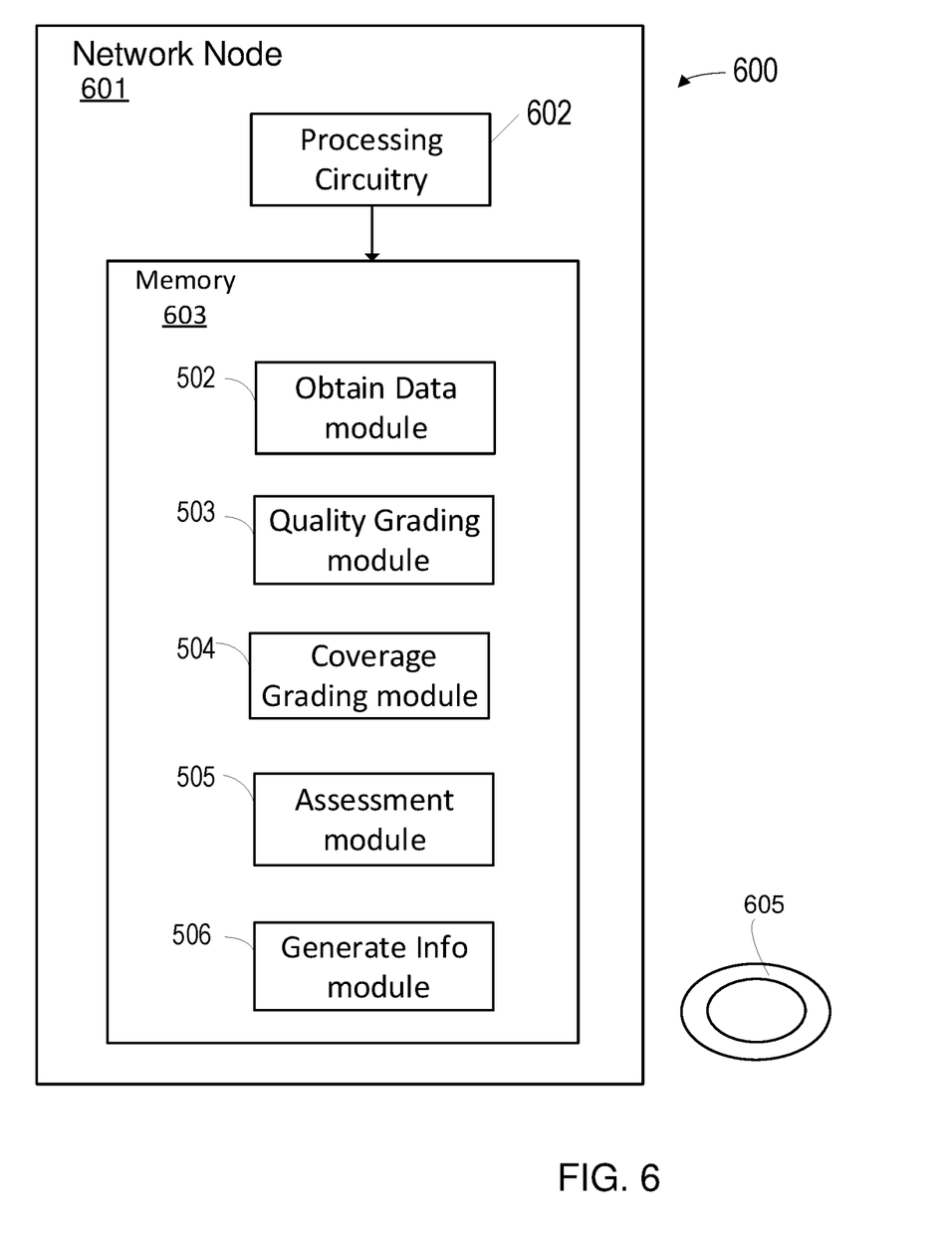
FIG. 6 illustrates another network node, according to some embodiments of the present disclosure.

FIG. 6 is a schematic diagram 600 of a network node 601 according to some embodiments of the present disclosure. The network node 601 can implement the functions of the indoor traffic information generation functionality 106 of FIG. 1 and the method 200 of FIG. 2, as well as the system 300 of FIG. 3 or the method 400 of FIG. 4. The network node 601 can comprise or be part of the network node 104 or SON 105, or implemented in another network node of the wireless communication network 100. The network node 601 can be configured to implement the modules 502-506 of FIG. 5, wherein the instructions of the computer program for providing the functions of modules 502-506 reside in memory 603.

The network node 601 comprises processing circuitry (such as one or more processors) 602 and a non-transitory machine-readable medium, such as the memory 603. The processing circuitry 602 provides the processing capability. The memory 603 can store instructions which, when executed by the processing circuitry 602, are capable of configuring the network node 601 to perform the methods described in the present disclosure. The memory can be a computer readable storage medium, such as, but not limited to, any type of disk 605 including magnetic disks, optical disks, CD-ROMs, and magnetic-optical disks, read-only memories (ROMs), random access memories (RAMs), EPROMs, EEPROMs, magnetic or optical cards, or any type of media suitable for storing electronic instructions. Furthermore, a carrier containing the computer program instructions can also be one of an electronic signal, optical signal, radio signal or computer storage medium.

Figure 7:
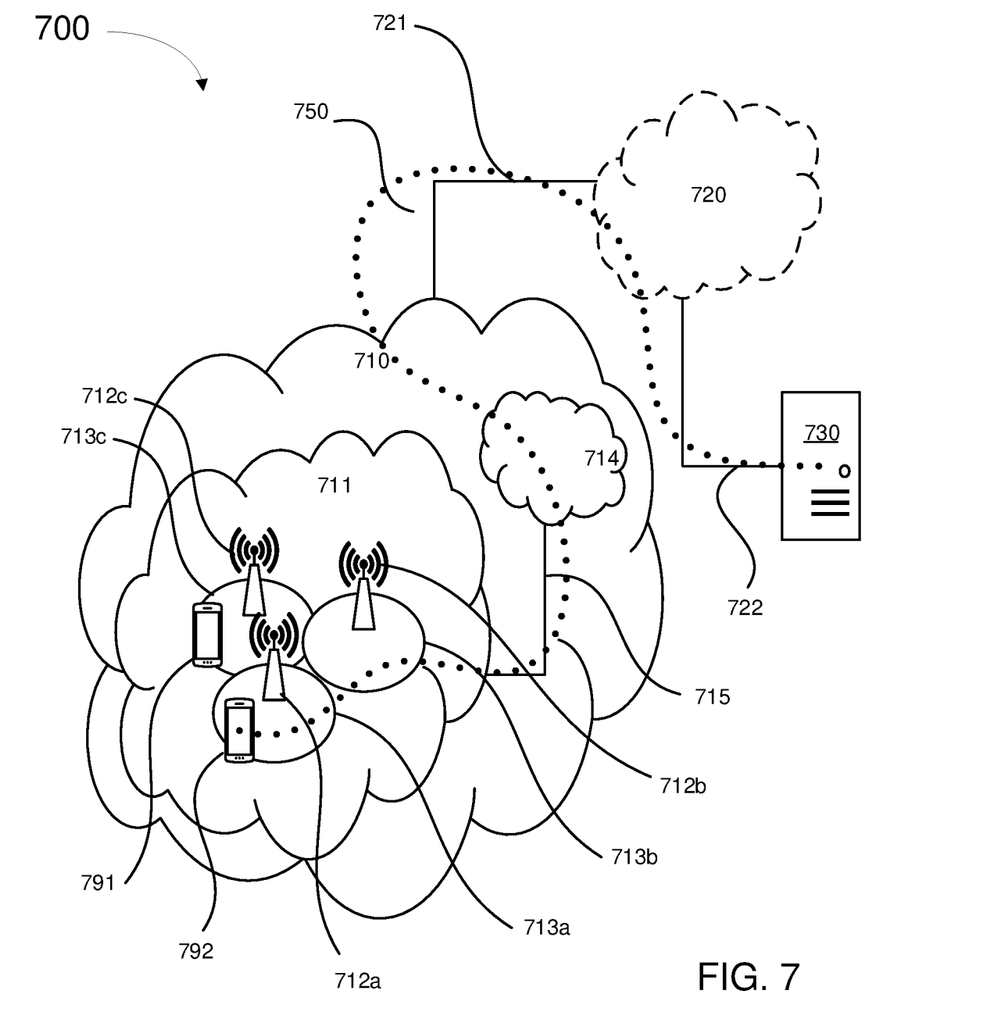
FIG. 7 illustrates a communication system, according to some embodiments of the present disclosure.

With reference to FIG. 7, in accordance with some embodiment, a communication system 700 includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to core network 714 over a wired or wireless connection 715. A first terminal device 791 located in coverage area 713c is configured to wirelessly connect to, or be paged by, the corresponding base station 712c. A second terminal device 792 in coverage area 713a is wirelessly connectable to the corresponding base station 712a. While a plurality of terminal devices 791, 792 are illustrated in this example, the disclosed embodiments are equally applicable to a situation where a sole terminal device is in the coverage area or where a sole terminal device is connecting to the corresponding base station 712.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more sub-networks (not shown).

The communication system of FIG. 7 enables connectivity between the connected terminal devices 791, 792 and host computer 730. The connectivity may be described as an over-the-top (OTT) connection 750. Host computer 730 and the connected terminal devices 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected terminal device 791. Similarly, base station 712 need not be aware of the future routing of an outgoing uplink communication originating from the terminal device 791 towards the host computer 730.

The various techniques described in the present disclosure can be practiced in one or more network nodes of communication system 700, including core network 714 and base station 712a, 712b, 712c.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Furthermore, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

What is claimed is:

1. A method for detecting indoor traffic of a wireless communications network, the method comprising:
    obtaining data associated with an operation of a cell of the wireless communications network from a Self-Organizing Network (SON), wherein the SON has self-optimizing functionalities to collect the data related to the wireless communications network;
    determining a quality grading for the cell from the obtained data by performing, based on the obtained data, one or more of:
        statistical modeling of uplink signals to determine cumulative distribution function on uplink signal quality;
        statistical modelling of uplink signals to determine uplink signal quality and compare the uplink signal quality with other cells; and
        percentage sampling of uplink quality metrics of the uplink signals to compare percentile value with other cells;
    determining a coverage grading for the cell from the obtained data;
    assessing the quality grading and the coverage grading to determine an approximate value corresponding to an amount of cell traffic assessed as being indoor traffic; and
    generating an output indicating the amount of cell traffic as being indoor traffic.

2. The method according to claim 1, further comprising collecting, by the SON, the data associated with the operation of the cell from the wireless communications network.

3. The method according to claim 1, wherein the obtained data comprises one or more of:
    cell coverage assessment;
    cell center coverage assessment;
    uplink signal to noise value;
    uplink signal to noise absolute ratio;
    group carrier information;
    area code tracking information; and
    urban-rural morphology classification of the cell.

4. The method according to claim 1, wherein the determining the coverage grading for the cell comprises one or more of:
    performing, based on the obtained data, cell edge coverage cumulative distribution function based analysis by use of precomputed upper and lower percentile thresholds;
    performing, based on the obtained data, cell edge coverage cumulative distribution function based analysis by evaluating a level of poor coverage at cell edge;
    performing, based on the obtained data, cell center cumulative distribution function based analysis by computing percentile thresholds for cell center coverage; and
    performing, based on the obtained data, cell center cumulative distribution function based analysis by assessing a relative cell center coverage in terms of poor, medium, or good relative to other cells.

5. The method according to claim 4, wherein the assessing the quality grading and the coverage grading comprises one or more of:
    assessing the quality grading and the coverage grading for indoor traffic determination combining uplink quality metrics and cell edge metrics by comparative analysis of cell edge grading in terms of predetermined grades;
    assessing the quality grading and the coverage grading for indoor traffic determination combining uplink quality metrics and cell edge metrics by reference comparison to quality assessment;
    assessing the quality grading and the coverage grading for cell center evaluation by determining whether cell center analysis meets a predetermined threshold; and
    assessing the quality grading and the coverage grading for a combination of quality and coverage imbalance to generate a list of indoor traffic.

6. The method according to claim 1, wherein the generating the output indicating the amount of cell traffic as being indoor traffic comprises generating a list of cells where user traffic is indoor.

7. The method according to claim 1, wherein the generating the output indicating the amount of cell traffic as being indoor traffic comprises generating the output for a particular set of devices connected to the cell or for a particular use by devices connected to the cell.

8. A network node of a wireless communications network for detecting indoor traffic of the wireless communications network, the network node comprising:
a processor; and
a memory containing instructions which, when executed by the processor, cause the network node to perform operations to:
obtain data associated with an operation of a cell of the wireless communications network from a Self-Organizing Network (SON), wherein the SON has self-optimizing functionalities to collect the data related to the wireless communications network;
determine a quality grading for the cell from the obtained data, wherein to determine the quality grading comprises performance of one or more operations for:
statistical modeling of uplink signals to determine cumulative distribution function on uplink signal quality;
statistical modelling of uplink signals to determine uplink signal quality and compare the uplink signal quality with other cells; and
percentage sampling of uplink quality metrics of the uplink signals to compare percentile value with other cells;
determine a coverage grading for the cell from the obtained data;
assess the quality grading and the coverage grading to determine an approximate value corresponding to an amount of cell traffic assessed as being indoor traffic; and
generate an output indicating the amount of cell traffic as being indoor traffic.

9. The network node according to claim 8, wherein the network node is further to collect, by the SON, the data associated with the operation of the cell from the wireless communications network.

10. The network node according to claim 8, wherein the obtained data comprises one or more of:
cell coverage assessment;
cell center coverage assessment;
uplink signal to noise value;
uplink signal to noise absolute ratio;
group carrier information;
area code tracking information; and
urban-rural morphology classification of the cell.

11. The network node according to claim 8, wherein to determine the coverage grading for the cell comprises one or more operations to:
perform, based on the obtained data, cell edge coverage cumulative distribution function based analysis by use of precomputed upper and lower percentile thresholds;
perform, based on the obtained data, cell edge coverage cumulative distribution function based analysis by evaluating a level of poor coverage at cell edge;
perform, based on the obtained data, cell center cumulative distribution function based analysis by computing percentile thresholds for cell center coverage; and
perform, based on the obtained data, cell center cumulative distribution function based analysis by assessing a relative cell center coverage in terms of poor, medium, or good relative to other cells.

12. The network node according to claim 11, wherein to assess the quality grading and the coverage grading comprises one or more operations to:
assess the quality grading and the coverage grading for indoor traffic determination combining uplink quality metrics and cell edge metrics by comparative analysis of cell edge grading in terms of predetermined grades;
assess the quality grading and the coverage grading for indoor traffic determination combining uplink quality metrics and cell edge metrics by reference comparison to quality assessment;
assess the quality grading and the coverage grading for cell center evaluation by determining whether cell center analysis meets a predetermined threshold; and
assess the quality grading and the coverage grading for a combination of quality and coverage imbalance to generate a list of indoor traffic.

13. The network node according to claim 8, wherein to generate the output indicating the amount of cell traffic as being indoor traffic comprises, for the network node, to generate a list of cells where user traffic is indoor.

14. The network node according to claim 8, wherein to generate the output indicating the amount of cell traffic as being indoor traffic comprises, for the network node, to generate the output for a particular set of devices connected to the cell or for a particular use by devices connected to the cell.

15. The network node according to claim 8, wherein the cell is associated with a base station of the wireless communications network.

16. A non-transitory computer readable storage medium comprising instructions which, when executed by at least one processing circuitry of a network node of a wireless communications network, is capable of detecting indoor traffic of the wireless communications network by having the network node perform operations comprising:
obtaining data associated with an operation of a cell of the wireless communications network from a Self-Organizing Network (SON), wherein the SON has self-optimizing functionalities to collect the data related to the wireless communications network;
determining a quality grading for the cell from the obtained data by performing, based on the obtained data, one or more of:
statistical modeling of uplink signals to determine cumulative distribution function on uplink signal quality;
statistical modelling of uplink signals to determine uplink signal quality and compare the uplink signal quality with other cells; and
percentage sampling of uplink quality metrics of the uplink signals to compare percentile value with other cells;
determining a coverage grading for the cell from the obtained data;
assessing the quality grading and the coverage grading to determine an approximate value corresponding to an amount of cell traffic assessed as being indoor traffic; and
generating an output indicating the amount of cell traffic as being indoor traffic.

* * * * *